(12) United States Patent
Yang et al.

(10) Patent No.: US 12,001,846 B2
(45) Date of Patent: Jun. 4, 2024

(54) SYSTEMS, METHODS, AND DEVICES FOR QUEUE AVAILABILITY MONITORING

(71) Applicant: Samsung Electronics Co., Ltd., Suwon-si (KR)

(72) Inventors: Chao Yang, San Jose, CA (US); Wentao Wu, San Jose, CA (US); Glenn Yu, San Jose, CA (US); Wei Zhao, San Jose, CA (US); Fnu Vikram Singh, San Jose, CA (US); Xiaoyi Zhang, San Jose, CA (US); Yong Yang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/963,189

(22) Filed: Oct. 10, 2022

(65) Prior Publication Data
US 2023/0108597 A1    Apr. 6, 2023

Related U.S. Application Data

(63) Continuation of application No. 17/001,674, filed on Aug. 24, 2020, now Pat. No. 11,467,843.
(Continued)

(51) Int. Cl.
*G06F 9/38* (2018.01)
*G06F 3/06* (2006.01)
(Continued)

(52) U.S. Cl.
CPC .......... *G06F 9/3856* (2023.08); *G06F 3/0611* (2013.01); *G06F 3/0659* (2013.01);
(Continued)

(58) Field of Classification Search
None
See application file for complete search history.

(56) References Cited

U.S. PATENT DOCUMENTS

| 10,061,727 | B2 | 8/2018 | Canepa et al. |
| 10,261,695 | B2 | 4/2019 | Benisty et al. |
| (Continued) | | | |

OTHER PUBLICATIONS

Final Office Action for U.S. Appl. No. 17/001,674, dated Feb. 16, 2022.
(Continued)

*Primary Examiner* — Scott C Sun
(74) *Attorney, Agent, or Firm* — Renaissance IP Law Group LLP

(57) ABSTRACT

A method may include determining, with a queue availability module, that an entry is available in a queue, asserting a bit in a register based on determining that an entry is available in the queue, determining, with a processor, that the bit is asserted, and processing, with the processor, the entry in the queue based on determining that the bit is asserted. The method may further include storing the register in a tightly coupled memory associated with the processor. The method may further include storing the queue in the tightly coupled memory. The method may further include determining, with the queue availability module, that an entry is available in a second queue, and asserting a second bit in the register based on determining that an entry is available in the second queue. The method may further include finding the first bit in the register using a find first instruction.

20 Claims, 4 Drawing Sheets

500

| D15 | D14 | D13 | D12 | D11 | D10 | D09 | D08 | D07 | D06 | D05 | D04 | D03 | D02 | D01 | D00 |
|---|---|---|---|---|---|---|---|---|---|---|---|---|---|---|---|
| CMD0 | CMD1 | CMD2 | CMD3 | DMA0 | DMA1 | DMA2 | DMA3 | DMA4 | TQ0 | TQ1 | | | | | |

Related U.S. Application Data

(60) Provisional application No. 63/041,113, filed on Jun. 18, 2020.

(51) Int. Cl.
  *G06F 9/30* (2018.01)
  *G06F 9/54* (2006.01)
  *G06F 11/30* (2006.01)

(52) U.S. Cl.
  CPC ........ *G06F 3/0673* (2013.01); *G06F 9/30018* (2013.01); *G06F 9/3834* (2013.01); *G06F 9/544* (2013.01); *G06F 11/3051* (2013.01)

(56) References Cited

U.S. PATENT DOCUMENTS

| | | | |
|---|---|---|---|
| 10,305,813 B2 | 5/2019 | Tamir et al. | |
| 10,310,996 B2 | 6/2019 | Bubb et al. | |
| 10,394,678 B2 | 8/2019 | Heirman et al. | |
| 2002/0131433 A1* | 9/2002 | Rumer | H04Q 11/0478 370/411 |
| 2009/0034549 A1* | 2/2009 | Soni | H04L 49/901 370/412 |
| 2014/0258680 A1* | 9/2014 | Ingle | G06F 9/3802 712/205 |
| 2016/0342545 A1 | 11/2016 | Arai et al. | |
| 2018/0275872 A1 | 9/2018 | Benisty et al. | |
| 2019/0138210 A1 | 5/2019 | Lindholm | |
| 2020/0004607 A1 | 1/2020 | Mahajani et al. | |

OTHER PUBLICATIONS

Notice of Allowance for U.S. Appl. No. 17/001,674, dated Jun. 1, 2022.

Office Action for U.S. Appl. No. 17/001,674, dated Oct. 28, 2021.

* cited by examiner

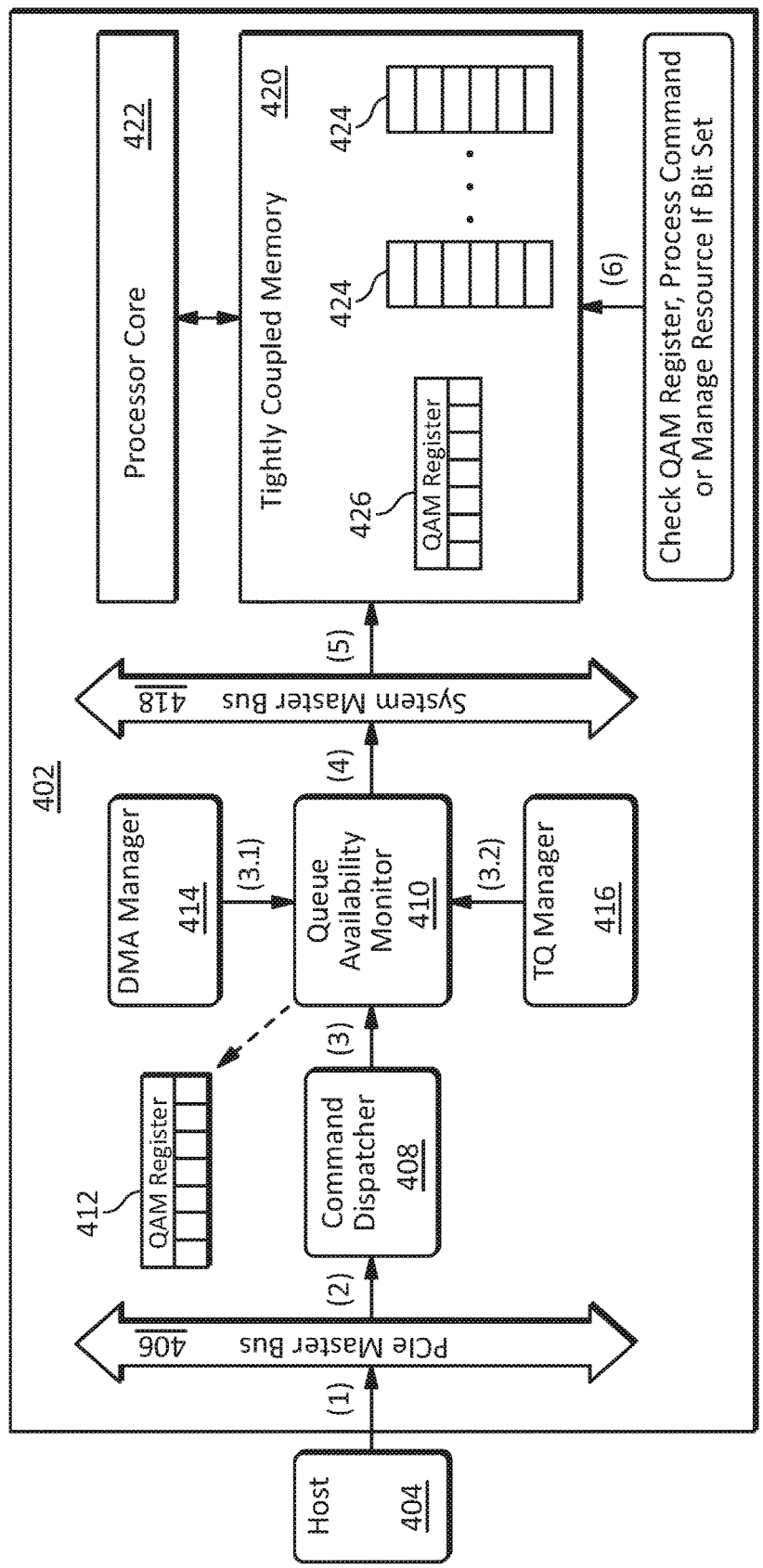

SYSTEMS, METHODS, AND DEVICES FOR QUEUE AVAILABILITY MONITORING

CROSS-REFERENCE TO RELATED APPLICATIONS

This application is a continuation of U.S. patent application Ser. No. 17/001,674, filed Aug. 24, 2020, which claims priority to, and the benefit of, U.S. Provisional patent application Ser. No. 63/041,113 filed Jun. 18, 2020 which are both incorporated by reference.

TECHNICAL HELD

This disclosure relates generally to queues, and specifically to systems, methods, and devices for queue availability monitoring.

BACKGROUND

A queue may store one or more entries such as a command and/or a request that may be processed by a processor. A processor may check the queue to determine if the queue has any entries that are available for processing.

The above information disclosed in this Background section is only for enhancement of understanding of the background of the invention and therefore it may contain information that does not constitute prior art.

SUMMARY

A method may include determining, with a queue availability module, that an entry is available in a queue, asserting a bit in a register based on determining that an entry is available in the queue, determining, with a processor, that the bit is asserted, and processing, with the processor, the entry in the queue based on determining that the bit is asserted. The method may further include storing the register in a tightly coupled memory associated with the processor. The method may further include storing the queue in the tightly coupled memory. The queue may be a first queue, the bit may be a first bit, and the method may further include determining, with the queue availability module, that an entry is available in a second queue, and asserting a second bit in the register based on determining that an entry is available in the second queue. The method may further include finding the first bit in the register using a find-first instruction. The method may further include determining, with the processor, that the second bit is asserted, and processing, with the processor, the entry in the second queue based on determining that the second bit is asserted. The queue may include one of a command queue, a direct memory access (DMA) queue, or a transfer queue. Processing the entry may include processing a command. Processing the entry may include managing a resource. The method may further include receiving a command from a host through a communication interface, parsing the command, and storing the command as the entry in the queue. Determining that an entry is available in the queue may include checking a phase tag of the entry.

A system may include a queue configured to hold one or more entries, a register comprising a bit to indicate an availability of one or more entries in the queue, a queue availability module configured to monitor the queue and assert the bit in the register based on determining that one or more entries are available in the queue, and a processor configured to check the register and process an entry in the queue based on determining that the bit in the register is asserted. The queue availability module may be coupled to the processor through a system bus, and the register may be stored on the processor side of the system bus. The register may be stored in a tightly coupled memory associated with the processor. The queue may be a first queue, the bit may be a first bit, the system may further include a second queue configured to hold one or more entries, the queue availability module may be further configured to monitor the second queue and assert a second bit in the register based on determining that one or more entries are available in the second queue, and the processor may be further configured to check the register and process an entry in the second queue based on determining that the second bit in the register is asserted. The processor may be further configured to check the register using a find-first instruction.

A method may include monitoring a queue with a queue availability module, updating, with the queue availability module, a register based on an available entry in the queue, checking, with a processor, the register, and processing, with the processor, the available entry based on a state of the register. The queue may be a first queue, updating the register may include asserting a first bit in the register, and the method may further include monitoring a second queue with the queue availability module, and updating, with the queue availability module, a second bit in the register based on an available entry in the second queue. The method may further include storing the register in a tightly coupled memory associated with the processor. The register may be checked with a find-first instruction.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 4 illustrates an example embodiment of a system having queue availability monitoring for multiple queues associated with multiple modules, along with process and data flows through the system, according to this disclosure.

FIG. 5 illustrates an example embodiment of a queue availability monitor register according to this disclosure.

DETAILED DESCRIPTION

Overview

Figure 1:
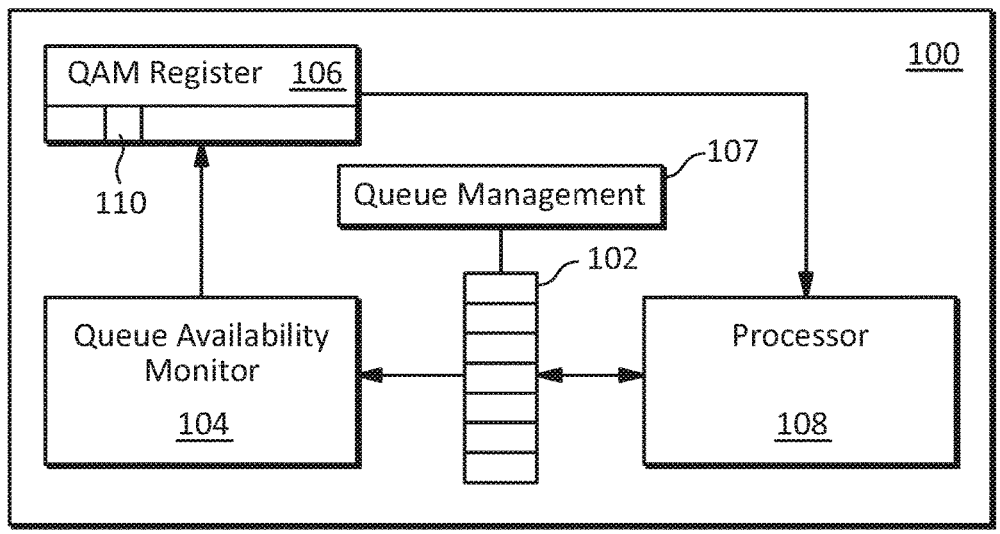
FIG. 1 illustrates an embodiment of a system having queue availability monitoring according to this disclosure.

An embodiment may monitor a queue for an available entry. If an entry is available in the queue, a corresponding bit in a register may be asserted. A processor may then check the bit and, if the bit is asserted, process an entry in the corresponding queue. In some embodiments, the queue may be monitored by a queue availability monitor (QAM) module. Depending on the implementation details, the QAM module and/or register may reduce latency, for example, by reducing or eliminating the amount of time that would be involved if the processor checked the queue for an available entry.

In some embodiments, a QAM module may monitor multiple queues and assert a corresponding bit for each queue having an available entry. The bits corresponding to different queues may be grouped into the same register. One or more processors may then check the multiple bits and process entries in queues corresponding to asserted bits in the register. Depending on the implementation details, consolidating bits for multiple queues into the same register may reduce latency, for example, by reducing or eliminating the amount of time for one or more processors to check bits for multiple queues.

In some embodiments, one or more registers may be stored in a tightly coupled memory associated with a processor that may check the register. This may reduce latency, for example, by reducing or eliminating the time for the processor to access the register contents through a system bus or interface. In some embodiments, a processor may check a register having multiple bits using a find-first instruction such as, for example, a count leading zeros instruction or a count trailing zeros instruction. This may reduce latency, for example, by reducing or eliminating the amount of time for a processor to find a queue that may have an available entry.

Checking Queues

In some embodiments, a queue may operate through the use of pointers and/or fields such as a producer index (PI), a consumer index (CI), and/or a phase tag (PT) bit in an entry. The PI may point to the next free location to store an entry in a queue. The CI may point to the next entry to be pulled from the queue if the queue is not empty. The PI in an entry may be updated by a producer when an entry is added to the queue, and may indicate whether the new entry was posted as part of a previous or current round of additions.

A processor may check one or more queues for available entries to process. Checking a queue, however, may involve a relatively time-consuming process. For example, in an embodiment of a system, an embedded processor may check the PT bit of an entry at the CI position of a queue for input/output (I/O) operations using the example code shown in Table 1.

TABLE 1

```
01      Bool IsQueueEmpty(void * pEntries)
02      {
03          Entity *entry = reinterpret_cast<Entry *>(pEntries);
04          entry = &entry[CI];
05          return ((entry->InfoBits.nPT & 0x1) != nPT);
06      }
```

Executing this code may take a significant amount of time. Moreover, there may be multiple queues in the system that the processor may check while searching for available entries to process. Thus, checking queues for available entries may introduce significant additional central processing unit (CPU) cycles which may reduce I/O bandwidth and/or increase I/O latency.

Queue Availability Monitoring

FIG. 1 illustrates an embodiment of a system having queue availability monitoring according to this disclosure. The embodiment 100 illustrated in FIG. 1 may include a queue 102, a queue availability monitor (QAM) module 104, a QAM register 106, a queue management module 107, and a processor 108.

The queue 102 may be configured to hold entries such as commands, resource requests, management requests, transfer requests, and/or the like. The queue management module 107 may include hardware and/or software functionality to manage the queue 102. For example, in some embodiments in which the queue 102 is implemented as a circular queue, the queue management module 107 may include one or more registers that implement a PI bit, a CI bit and/or a PT bit for the queue. The queue management module 107 may also include a doorbell register that may have a bit that may be asserted by an entity such as other hardware and/or software when the entity places an entry in the queue 102.

The QAM module 104 may monitor the queue 102, for example, continuously, at periodic intervals, and/or the like, to determine when a new entry is placed in the queue 102. In some embodiments, the QAM module 104 may monitor the queue 102 proactively, for example, by continuously or frequently checking the state of the PI and determining that a new entry has been added when the PI changes. For example, if the queue 102 is implemented as a circular buffer having a PI, a CI and a PT bit, the QAM module 104 may check the PT bit of an entry at the CI position using logic similar to that describe above with respect to the example code. In some embodiments in which the QAM module 104 may be implemented with hardware, depending on the implementation details, the QAM module 104 may reduce the time involved with determining when an entry is available in the queue 102.

In some other embodiments, the QAM module 104 may monitor the queue 102, for example, by monitoring a bit in a doorbell register in the queue management module 107 that indicates that a new entry has been added. In some other embodiments, the QAM module 104 may monitor the queue 102, for example, by interfacing with the queue management module 107 that may notify the QAM module 104, for example, using a notification signal, when a new entry has been added to the queue 102.

In response to detecting that an entry is available in the queue 102, the QAM module 104 may assert a bit 110 corresponding to the queue 102 in the QAM register 106. In some embodiments, the bit 110 may be asserted by setting it to a logic "1." In other embodiments, the bit 110 may be asserted by clearing it to a logic "0."

The processor 108 may check the bit 110 in the QAM register 106 to determine if an entry is available in the queue 102. If the bit 110 is asserted, the processor 108 may pull an entry from the queue 102 and proceed to process the entry. For example, if the entry is a command such as a write command for a storage device, the processor 108 may proceed to retrieve data from a logical block address specified by the command, and transfer the data to a host. As another example, if the entry is a resource request for a computational process, the processor 108 may proceed to allocate one or more computational and/or memory resources based one or more parameters included in the entry.

The processor 108 may use various techniques to check the bit 110 in the QAM register 106. For example, in some embodiments, the processor may check the bit 110 periodically. In some embodiments, the processor may check the bit 110 in response to an event such as an interrupt which may be generated, for example, by the QAM module 104, e.g., when it asserts the bit 110.

After an entry has been pulled from the queue 102, the QAM module 104 may determine whether there are any additional entries in the queue 102. If there are any additional entries, the QAM module 104 may leave the bit 110 in the asserted state. However, if there are no more entries in the queue 102, the QAM may de-assert the bit 110. For example, in some embodiments, the processor 108 may increment the CI when it pulls an entry from the queue. The QAM module may then check for a condition in which the value of CI equals the value of PI, which may indicate that the queue 102 is empty. Alternatively, or additionally, the QAM module 104 may check the PT bit of an entry at the CI position using logic similar to that describe above with respect to the example code.

The queue 102 may have any structure such as a circular buffer, a linked list, and/or the like, and may store any type of data, commands, and/or the like in entries having any format. In some embodiments, the queue 102 may be associated with, and/or used by, one or more modules which may perform a function such as command dispatching, direct memory access (DMA) management, transfer management, and/or the like.

The QAM module 104 and/or the queue management module 107 may be implemented with hardware, software (which may include firmware), or any combination thereof. In some embodiments, the QAM module 104 and/or the queue management module 107 may be implemented entirely or primarily in hardware and may include, for example, combinational logic, sequential logic, timers, counters, registers, gate arrays, complex programmable logic devices (CPLDs), one or more state machines, and/or the like. In some embodiments, the QAM module 104 and/or the queue management module 107 may be implemented partially or primarily with software, for example with front-end hardware to interface with a hardware module having a queue, but with a dedicated or shared processor core, memory, program storage, and/or the like, which may be programmed to perform one or more monitoring functions. In some embodiments in which the QAM module 104 and/or the queue management module 107 may have at least a partial software implementation, the software may run on hardware that is separate from the processor 108. In some other embodiments in which the QAM module 104 and/or the queue management module 107 may have at least a partial software implementation, the software may run at least partially on the processor 108, for example, as a separate background process.

The QAM register 106 may be implemented with any type of memory such as, for example, system memory, cache memory, tightly coupled memory, and/or the like, using any memory technology including volatile memory of any type such as static random access memory (SRAM), dynamic random access memory (DRAM), nonvolatile memory of any type such as not-OR (NOR), not-AND (NAND), persistent memory, and/or the like.

The processor 108 may be implemented with any type of processing apparatus such as, for example, a dedicated or shared processor core, memory, program storage, and/or the like. In some embodiments, the processor 108 may be implemented as a separate component, as part of a field programmable gate array (FPGA), as part of an application specific integrated circuit (ASIC), and/or the like. In some embodiments, the processor 108 may be implemented as part of a device controller, for example, for a storage device, a graphics processing unit (GPU), and/or the like.

Figure 2:
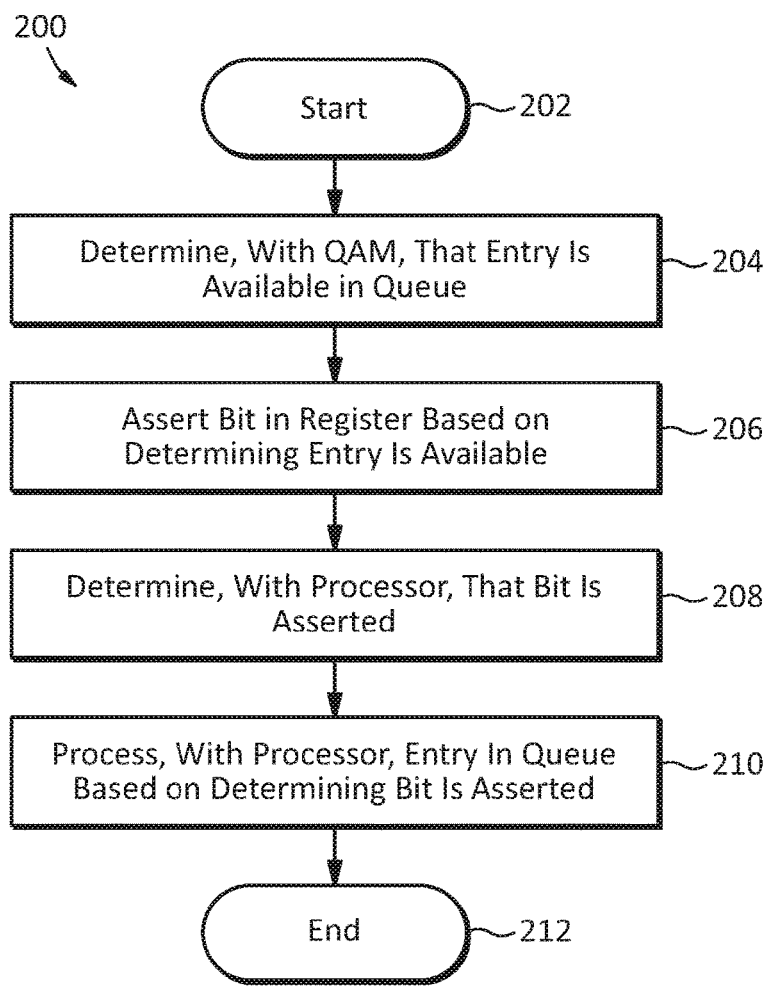
FIG. 2 illustrates a flow chart of an embodiment of a method for queue availability monitoring according to this disclosure.

FIG. 2 illustrates a flow chart of an embodiment of a method for queue availability monitoring according to this disclosure. The method illustrated in FIG. 2 may be used, for example, with the system illustrated in FIG. 1, but neither of the embodiments illustrated in FIGS. 1 and 2 are limited to use with the other embodiment.

Referring to FIG. 2, the method 200 may begin at operation 202. At operation 204, the method may determine, with a queue availability module, that an entry is available in a queue. At operation 206, the method may assert a bit in a register based on determining that an entry is available in the queue. At operation 208, the method may determine, with a processor, that the bit is asserted. At operation 210, the processor may process the entry in the queue based on determining that the bit is asserted. The method may end at operation 212.

The operations and/or components described with respect to the embodiment illustrated in FIG. 2, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Figure 3:
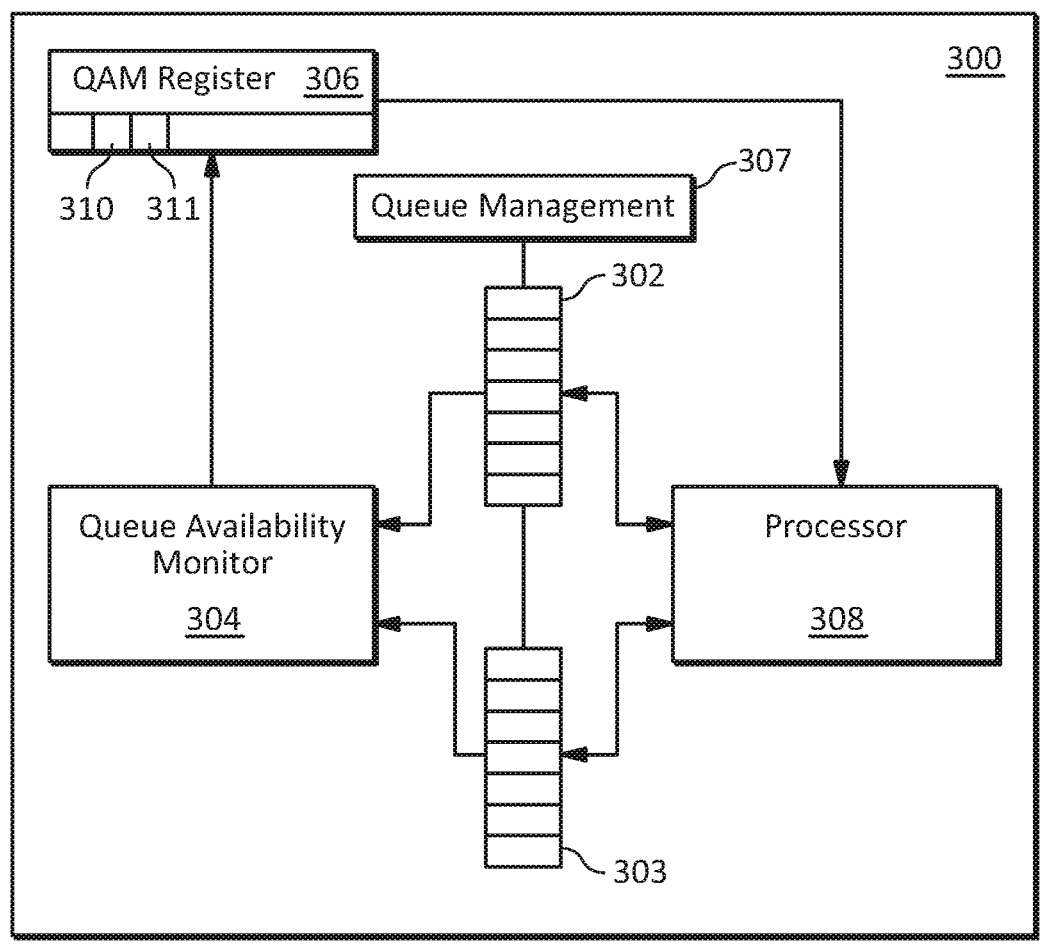
FIG. 3 illustrates an embodiment of a system having queue availability monitoring for multiple queues according to this disclosure.

FIG. 3 illustrates an embodiment of a system having queue availability monitoring for multiple queues according to this disclosure. The embodiment 300 illustrated in FIG. 3 may include a queue 302, a queue availability monitor (QAM) module 304, a QAM register 306, a queue management module 307, and a processor 308 similar to those in the embodiment shown in FIG. 1. However, the embodiment illustrated in FIG. 3 may also include an additional queue 303 and a corresponding bit 311 in the QAM register 306 in addition to the first bit 310. The QAM module 304 may monitor both queues 302 and 303 to determine when a new entry is placed in either queue. In response to detecting that an entry is available in the first queue 302, the QAM module 304 may assert the first bit 310 corresponding to the first queue 302 in the QAM register 306. In response to detecting that an entry is available in the second queue 303, the QAM module 304 may assert the second bit 311 corresponding to the second queue 303 in the QAM register 306, The processor 308 may check both bits 310 and 311 and proceed to pull and process one or more entries from any queue having at least one available entry.

In some embodiments, and depending on the implementation details, having bits for multiple queues grouped in a common register may help reduce latency. For example, the use of a common register may reduce the number of access to system memory, cache memory, and/or the like, the processor may make to determine if either of the queues have available entries. Moreover, having bits for multiple queues grouped in a common register may also reduce latency because it may enable the processor to efficiently search for the next queue having an available entry using a single instruction. For example, a processor may use a find-first instruction such as a count leading zeros instruction, a count trailing zeros instruction, a bit scan instruction, a find first set instruction, and/or the like.

The embodiments illustrated in FIGS. 1-3 may be modified in a wide variety of ways in accordance with this disclosure. For example, the embodiments illustrated in FIGS. 1 and 3 each include a single QAM module 104, QAM register 106 and processor 108, but in other embodiments, multiple instances of these components may be included. Moreover, although the QAM module 104, QAM register 106 and processor 108 are shown as separate components, in other embodiments any or all of these components may be integrated with each other and/or other components.

FIG. 4 illustrates an example embodiment of a system having queue availability monitoring for multiple queues associated with multiple modules, along with process and data flows through the system, according to this disclosure. FIG. 5 illustrates an example embodiment of a QAM register according to this disclosure. The system and data flow illustrated in FIG. 4 and the QAM register illustrated in FIG. 4 may be used in conjunction with each other, but neither is limited to the specific details of the other.

For purposes of illustrating some of the principles of this disclosure, the embodiments shown in FIGS. 4 and 5 may be described in the context of a solid state drive (SSD) that may implement a Nonvolatile Memory Express (NVMe) protocol using Peripheral Component Interconnect Express (PCIe) as an underlying communication interface. However, the principles of this disclosure are not limited to these implementation details. The components illustrated in FIG. 4 may be included, for example, in a storage device controller 402 for an SSD, In some embodiments, the controller 402 may be fabricated, for example, on an FPGA or ASIC.

At data flow (1), one or more commands such as, for example, administrative commands and/or I/O commands, may be received from a host 404 using an NVMe protocol through a PCIe interface (not shown) which may be coupled to the system through a first master bus 406. The first master interface 406 may be implemented, for example, using an Advanced Microcontroller Bus Architecture (AMBA) bus, an Advanced eXtensible Interface (AXI) bus, and/or the like. Because it provides an interface for a PCIe system, the first master bus 406 may be referred to as the PCIe master bus.

At data flow (2), the one or more commands received through the PCIe master bus 406 may be transferred to a command dispatcher module 408, which may parse the one or more commands. For example, one or more commands may be fetched from an I/O and/or administrative submission queue at the host 404. The command dispatcher module 408 may use any number of associated queues to store commands for the system 400. In this example embodiment, there may be four queues associated with the command dispatcher module 408 including command queues CMD0, CMD1, CMD2, and CMD3. The command queues may be used for purposes such as, for example, a write queue, an urgent write queue, a read queue, and an urgent read queue. Each of the command queues CMD0, CMD1, CMD2, and CMD3 may have a corresponding bit in the QAM register 500 as illustrated in FIG. 5.

In some embodiments, the command queues CMD0, CMD1, CMD2, and CMD3 may be implemented with queues located at the command dispatcher module 408. Additionally, or alternatively, the command queues CMD0, CMD1 CMD2, and CMD3 may be implemented with queues 424 in one or more tightly coupled memories 420 which may be associated with one or more processor cores 422 as explained in more detail below.

At data flow (3), a QAM module 410 may monitor the command queues CMD0, CMD1, CMD2, and CMD3 and update the corresponding bits in a QAM register 412 which may be implemented, for example, using a special function register in system memory within the device controller 402. The QAM register 412 may be configured, for example, in a manner similar to the QAM register 500 illustrated in FIG. 5.

At data flow (3.1), the QAM module 410 may monitor one or more queues that may be used by a DMA read/write manager module 414 and update corresponding bits in the QAM register 412. The DMA manager module 414 may implemented front-end DMA transactions, for example, with a host through the NVMe protocol, and/or back-end DMA transactions, for example, with a flash memory module through a flash translation layer (FTL). In this example embodiment, there may be five queues associated with the DMA manager module 414 including DMA queues DMA0, DMA1, DMA2, DMA3, and DMA4. The DMA queues may be used for purposes such as, for example, a write transfer queue, a read transfer queue, a write FTL queue, a read discrete done queue, and/or a write discrete done queue, Each of the DMA queues DMA0, DMA1, DMA2, DMA3, and DMA4 may have a corresponding bit in the QAM register 412 which may be configured, for example, in a manner similar to the QAM register 500 illustrated in FIG. 5.

At data flow (3.2), the QAM module 410 may monitor one or more queues that may be used by a transfer queue (TQ) read/write manager module 416 and update corresponding bits in the QAM register 412. In this example embodiment, there may be two queues associated with the TQ manager module 416 including TQ queues TQ0 and TQ1. The TQ queues may be used for purposes such as, for example, a write partial transfer done queue, and/or a read partial transfer done queue, Each of the TQ queues TQ0 and TQ1 may have a corresponding bit in the QAM register 412 which may be configured, for example, in a manner similar to the QAM register 500 illustrated in FIG. 5.

Although only one of the one or more tightly coupled memories 420 and associated processor cores 422 may be illustrated in FIG. 4, any number of tightly coupled memories 420 and/or associated processor cores 422 may be included. In some embodiments, each of the tightly coupled memories 420 and/or associated processor cores 422 may be interfaced to the system master bus 418. In some embodiments, there may be a one-to-one correspondence between tightly coupled memories 420 and processor cores 422, i.e., one tightly coupled memory per core. In other embodiments, one or more cores may be configured to operate with one or more memories in any arrangement. Moreover, in some embodiments, the queues such as command queues CMD0-CMD3, DMA queues DMA0-DMA4, and TQ queues TQ0 and TQ1 may be distributed as queues 424 among any number of tightly coupled memories 420, and their entries may be processed by any number of processor cores 422.

In some embodiments, at process flow (6), instructions (e.g., firmware) executed by the one or more processor cores 422 may determine whether there are any available entries in the queues 424 by accessing the QAM register 412 across the system master bus 418. The system master bus 418 may be implemented, for example, using an AMBA bus, an AXI bus, and/or the like. The one or more processor cores 422 executing the instructions may then proceed to process one or more entries that may be available in the queues 424 as indicated by the corresponding bits in the QAM register 412. For example, the processor cores 422 executing the instructions may process one or more commands in the command queues CMD0-CMD3. Similarly, the one or more processor cores 422 executing the instructions may manage and/or allocate resources in response to one or more requests in the DMA queues DMA0-DMA4, and/or TQ queues TQ0 and TQ1.

In some embodiments, data flows (4) and (5) may be implemented in which the QAM register 412 may be shadowed (e.g., continuously copied) to one or more QAM shadow registers 426 in the one or more tightly coupled memories 420. This shadowing operation may cross a system master bus 418. For example, in some embodiments, each time the QAM register 412 is updated, the QAM module 410 may initiate an update of one or more QAM shadow registers 426. A processor core 422 associated with a tightly coupled memory 420 may read the contents in the QAM shadow register 426. In some embodiments, and depending on the implementation details, shadowing the QAM register 412 to one or more QAM shadow registers 426 may reduce latency, for example, by enabling the one or more processor cores 422 to access the information in the QAM register 412 without crossing the system master bus 418.

In some embodiments, and depending on the implementation details, consolidating the bits corresponding to the queues CMD0-CMD3, DMA0-DMA4, and/or TQ0 and TQ1 into the common QAM register 412 (and/or the one or more shadow registers 424) may reduce latency by enable the one or more processor cores 422 to use an efficient bit manipulation instruction such as a find-first instruction to find the next queue having an available entry. For example, an implementation using one or more reduced instruction set computer (RISC) processor cores for the processor cores 422, a count leading zeros (CLZ) or count trailing zeros (CTZ) instruction may be used to find the first queue having an available entry.

In some embodiments, one or more of the components such as the command dispatcher module 408, QAM module 410, DMA manager module 414, and/or TQ manager module 416 may be implemented primarily in hardware, which, depending on the implementation details, may enable the use of dedicated hardware that may provide relatively fast operation. Examples of hardware that may be used to implement one or more of the components include combinational logic, sequential logic, timers, counters, registers, gate arrays, complex programmable logic devices (CPLDs), FPGAs, ASICSs, one or more state machines, and/or the like. In some embodiments, however, one or more of these components may be implemented in software (e.g., software executable by a processor), or a combination of hardware and software.

In some embodiments, in addition to components shown in FIG. 4, the storage device controller 402 may include additional components such as SRAM, DRAM, additional peripherals, a FTL, and/or the like, which may be accessed by the one or more processor cores 422 through, for example, the system master interface 418.

Although the embodiment illustrated in FIG. 4 is shown with specific numbers and/or types of processors, modules, queues, interfaces, and other components, and/or the like, in other embodiments, any numbers and/or types of processors, modules, queues, interfaces, and other components, and/or the like may be used.

Figure 6:
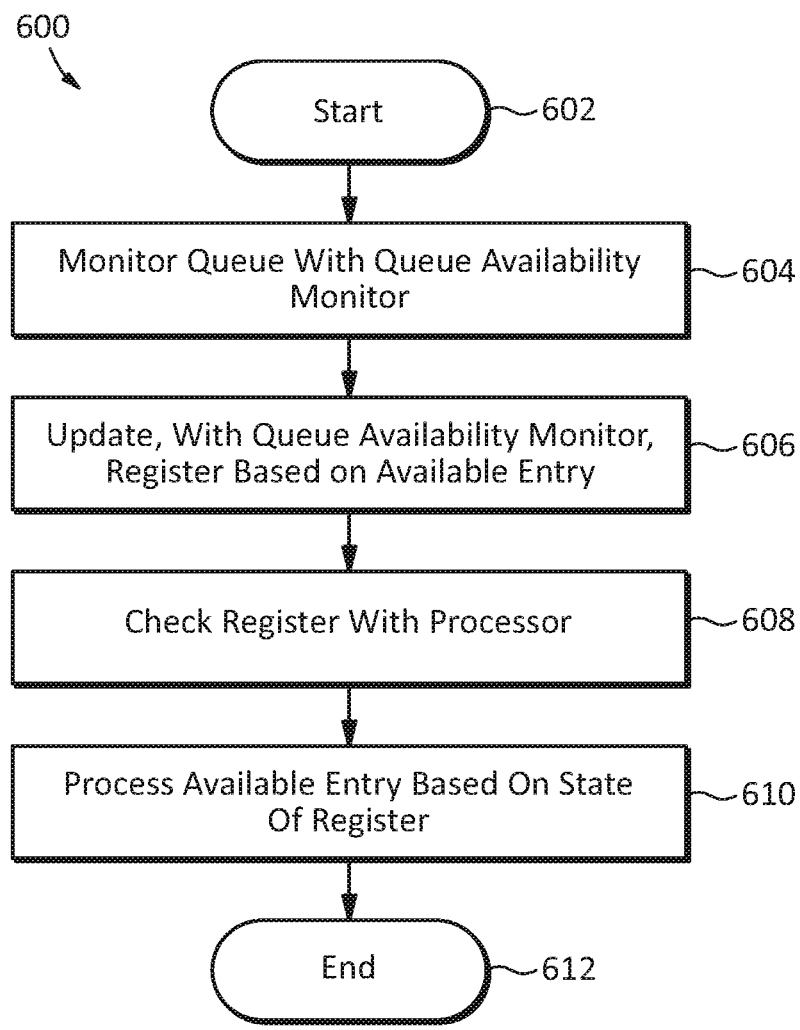
FIG. 6 illustrates a flow chart of another embodiment of a method for queue availability monitoring according to this disclosure.

FIG. 6 illustrates a flow chart of another embodiment of a method for queue availability monitoring according to this disclosure. The method 600 may begin at operation 602. At operation 604, the method may monitor a queue with a queue availability module. At operation 606, the method may update, with the queue availability module, a register based on an available entry in the queue. At operation 608, the method may check the register with a processor. At operation 610, the processor may process the available entry based on a state of the register. The method may end at operation 612.

The operations and/or components described with respect to the embodiment illustrated in FIG. 6, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more sub-blocks. The use of terms such as "first" and "second" in this disclosure and the claims may only be for purposes of distinguishing the things they modify and may not to indicate any spatial or temporal order unless apparent otherwise from context. In some embodiments, based on" may refer to "based at least in part on." In some embodiments, "disabled" may refer to "disabled at least in part." A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure, sometimes with synergistic results. Since the inventive principles of this patent disclosure may be modified in arrangement and detail without departing from the inventive concepts, such changes and modifications are considered to fall within the scope of the following claims.

The invention claimed is:

1. A method comprising:
   detecting, at a device, based at least in part on a doorbell indication, a first command for a protocol in a first command queue;
   modifying a first portion of a register based on the detecting the first command;
   detecting, at the device, a second command for the protocol in a second command queue;
   modifying a second portion of the register based on the detecting the second command; and
   processing, with a processor, the first command based on a status of the first portion of the register.

2. The method of claim 1, further comprising storing the register in a memory associated with the processor.

3. The method of claim 2, further comprising storing the first command queue in the memory associated with the processor.

4. The method of claim 1, further comprising determining the first portion of the register using a find instruction.

5. The method of claim 1, further comprising processing, with the processor, the second command based on the second portion of the register.

6. The method of claim 1, wherein the first command queue comprises a protocol queue, the method further comprising:
 detecting, with a queue availability module, a third command in a direct memory access (DMA) queue; and
 modifying a third portion of the register based on the detecting the third command in the DMA queue.

7. The method of claim 1, wherein the first command comprises a protocol command.

8. The method of claim 1, wherein the processing the first command comprises managing a resource.

9. The method of claim 1, further comprising:
 receiving the first command using a communication interface;
 parsing the first command; and
 storing the first command in the first command queue.

10. The method of claim 1, wherein the detecting the first command comprises checking a phase tag.

11. The method of claim 1, wherein the first command queue comprises a priority command queue.

12. A system comprising:
 a first command queue;
 a second command queue;
 a register comprising a first portion to indicate, based at least in part on at least one doorbell indication, a first command for a protocol in the first command queue and a second portion to indicate, based at least in part on the at least one doorbell indication, a second command for the protocol in the second command queue; and
 a storage device comprising a processor configured to process the first command based on a status of the first portion of the register.

13. The system of claim 12, further comprising a queue availability module coupled to the processor using a system bus, wherein the register is stored on a processor side of the system bus.

14. The system of claim 12, wherein the register is stored in a memory associated with the processor.

15. The system of claim 12, wherein the processor is further configured to process the second command based on the second portion of the register.

16. The system of claim 15, wherein the processor is further configured to check the register using a find instruction.

17. The system of claim 12, wherein the register is a first register, the system further comprising a second register configured to duplicate at least a portion of the first register.

18. A method comprising:
 monitoring, at a device, a first command queue and a second command queue;
 modifying a first portion of a register based, at least in part, on at least one doorbell indication and a first command for a protocol in the first command queue;
 modifying a second portion of the register based, at least in part, on the at least one doorbell indication and a second command for the protocol in the second command queue; and
 processing, with a processor at the device, the first command based on a state of the first portion of the register.

19. The method of claim 18, further comprising storing the register in a memory associated with the processor.

20. The method of claim 18, further comprising determining the first portion of the register using a find instruction.

* * * * *